Sept. 15, 1970     G. A. GODWIN     3,529,139
ANALYZING CIRCUIT
Filed Aug. 11, 1967     3 Sheets-Sheet 2
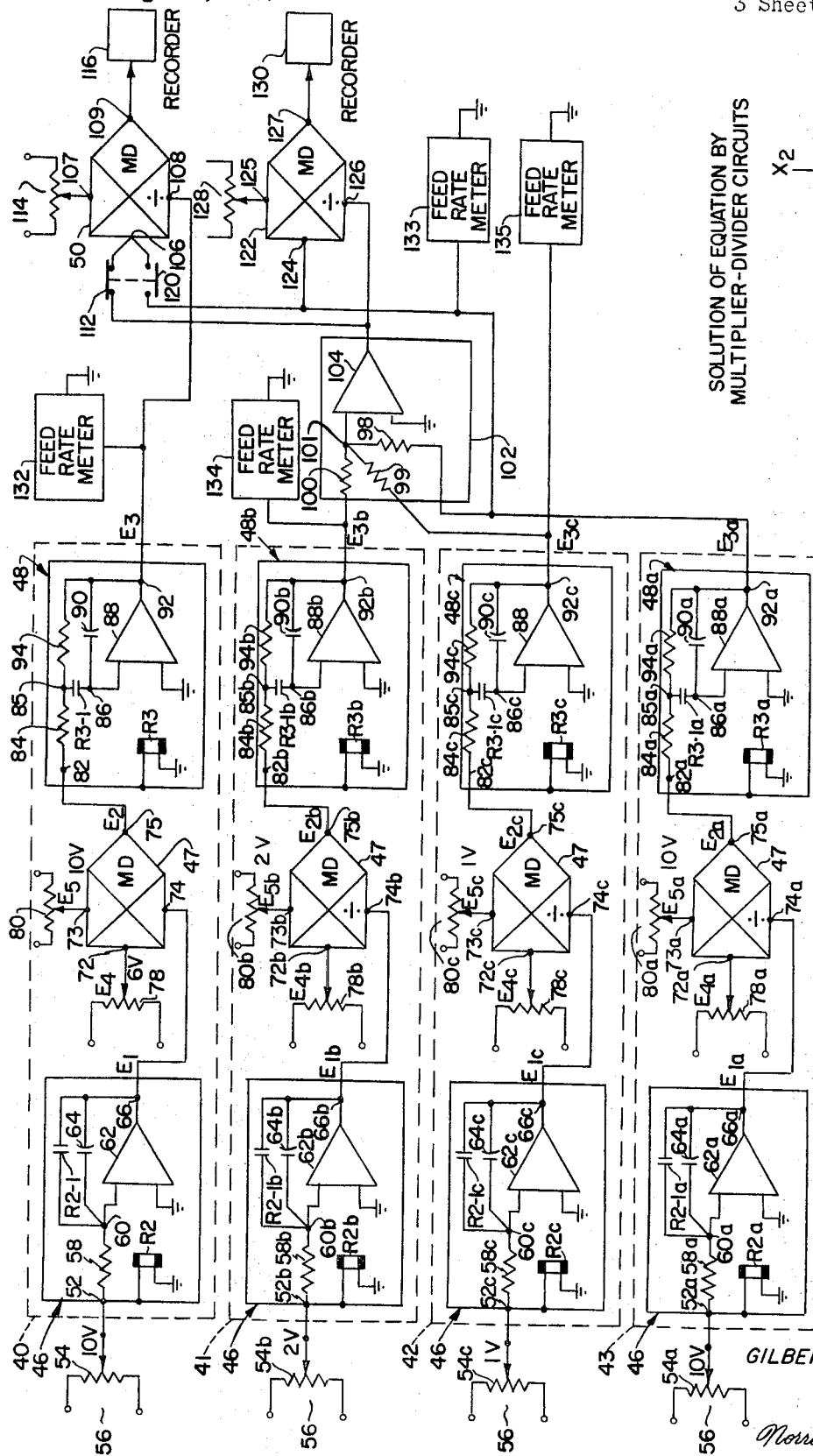
INVENTOR
GILBERT A. GODWIN
*Norris & Bateman*
ATTORNEYS

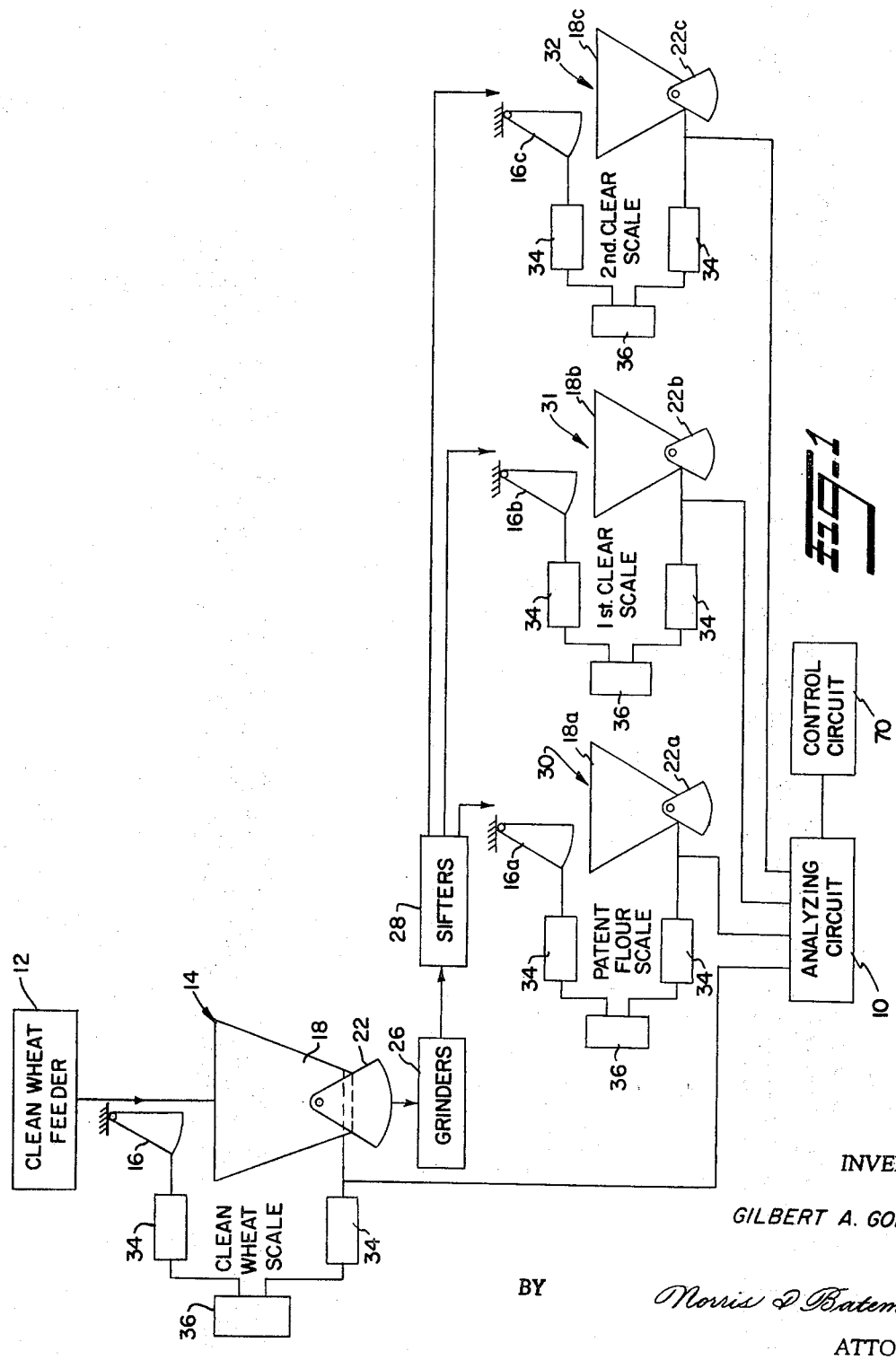

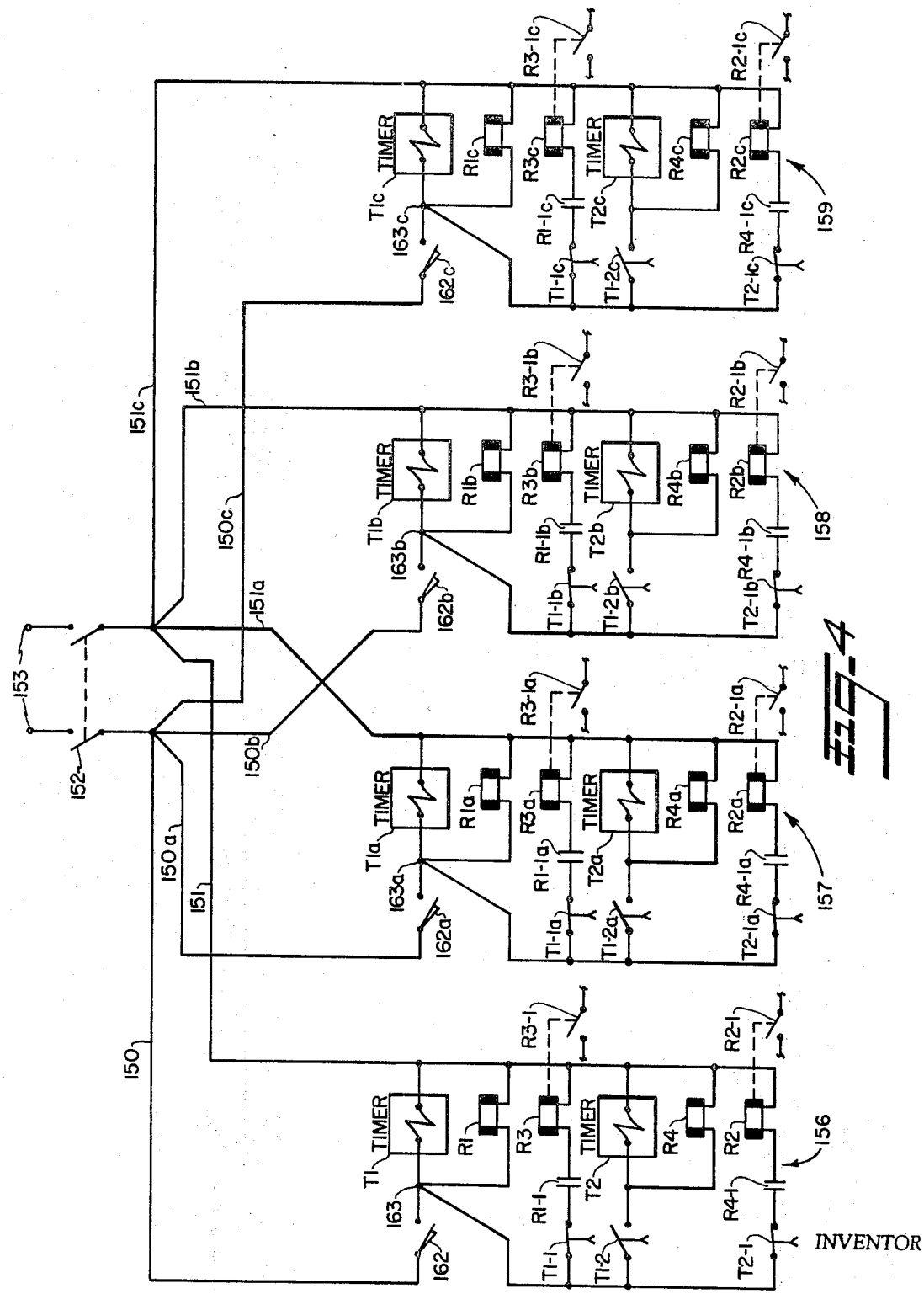

United States Patent Office 3,529,139
Patented Sept. 15, 1970

3,529,139
ANALYZING CIRCUIT
Gilbert A. Godwin, Oakland, N.J., assignor to Howe Richardson Scale Company, Clifton, N.J., a corporation of Delaware
Filed Aug. 11, 1967, Ser. No. 660,105
Int. Cl. G06g 7/12; G01g 11/14, 13/00
U.S. Cl. 235—151.3         13 Claims

ABSTRACT OF THE DISCLOSURE

An electrical anaylzing circuit for solving mathematical expressions which contain the feed rates of ingredients being processed. Signals representing the material feed rates are each developed by dividing an integrator ramp signal into a pre-set signal. The ramp signal represents the time in which a predetermined weight of the material moves past a given point, and the pre-set signal represents the predetermined weight.

FIELD OF INVENTION

This invention relates to rate-determining and analyzing circuits and is particularly useful in solving equations used in analyzing flour-producing processes.

BACKGROUND

In ordinary milling, the grades of flour in order of quality are (1) patent flour, (2) first clear flour, and (3) second clear flour. These various grades of flour are often separated from each other by conventional sifting and grinding operations.

Ordinary milling operations are analyzed by periodically determining the patent flour yield, patent extraction, and yield. From these factors the operator of the mill can determine where adjustments or repairs are needed to provide an optimum yield of the different grades of flour mentioned above.

Patent yield is determined from the following equation:

$$\frac{P}{P+C_1+C_2}$$

where P is the feed rate of patent flour being produced, $C_1$ is the feed rate of first clear flour being produced, and $C_2$ is the feed rate of second clear flour being produced.

Patent extraction is determined by $P/W$ where W is the feed rate of clean wheat being delivered.

Yield is equal to $$\frac{P+C_1+C_2}{W}$$

Heretofore no practical way for rapidly and accurately determining the efficiency of the mill was available. As a result, effective control over the yield of the different grades of flour could not be maintained.

SUMMARY OF INVENTION AND OBJECTS

The present invention overcomes the foregoing problems by providing a novel analyzing circuit which is automatically effective to rapidly solve the above-mentioned equations with satisfactory accuracy. This is accomplished in conjunction with existing constant dump type scales or the like which are normally present in a flour mill. One scale is located to receive clean wheat from a continuously operated feeder and periodically dumps loads of equal weight into the grinding apparatus of the mill. The other scales are located to weigh out the sifted patent and clear flours. The analyzing circuit of this invention has an integrator for each scale which determines the cycle time from dump to dump. This time signal is divided by a multiplier-divider circuit into a weight signal representing the weight of each dump to provide an average feed rate, and the result is sampled when the integrator ramp signal at least approaches its maximum value. The sampled signal is transmitted to one or more multiplier-divider circuits which solve the above-mentioned expressions for obtaining the patent yield, patent extraction, and yield factors.

The rate-determining equipment of this invention is particularly simplified, for the need of determining the weight of the material with such relatively expensive force transducer devices as load cells is avoided. This is accomplished by the novel combination of the integrator ramp and pre-set signals respectively representing weighing cycle time and the known weight of the loads weighed out by the scales.

It is to be noted that the circuit of this invention has a wide variety of applications and therefore is not limited to a flour analyzer.

Accordingly, a major object of this invention is to provide a novel analyzing circuit for solving mathematical expressions.

Another object of this invention is to provide a novel rate-determining circuit wherein a measured variable is converted by an integrator into an electrical signal which is applied in multiplication and division operations to obtain the solution to mathematical expressions.

Still another object of this invention is to provide a novel analyzing circuit composed of networks which can be applied to printed circuit cards.

A more specific object of this invention is to provide a novel analyzing circuit wherein feed rate of each of a plurality of materials is obtained by measuring the time of the feed with an integrator, dividing the measured time into the weight transferred during the measured time, and multiplying the rate with a scaling factor so that the feed rates for all of the materials have a common rate setting.

Further objects of this invention will appear as the description proceeds in connection with the appended claims and annexed drawings wherein:

FIG. 1 is a generally diagrammatic view illustrating a flour mill incorporating the analyzer circuit of this invention;

FIG. 2 diagrammatically illustrates the analyzing circuit shown in FIG. 1;

FIG. 3 is a legend showing the general mathematical expression solved by the multiplier-dividers in the analyzing circuit of FIG. 2; and FIG. 4 illustrates the control circuit shown in FIG. 1.

As shown in FIG. 1, the analyzing circuit 10 of this invention is applied to a conventional flour mill wherein clean wheat is continuously fed by a suitable feeder 12 to a conventional automatic constant dump type scale 14. Scale 14 may be of any suitable construction and is shown in this embodiment to comprise a pivotal catch gate 16 and a beam-supported weigh hopper 18. With this arrangement, feeder 12 is continuously feeding and hopper 18 is periodically dumped by opening a discharge gate 22 when the weight of wheat delivered to the hopper reaches a pre-selected amount. Operation of gates 16 and 22 is so correlated that when discharge gate 22 is opened, catch gate 16 is pivoted to its closed position where it interrupts delivery of the wheat to hopper 18 and catches the wheat being supplied by feeder 12. When gate 22 is closed, catch gate 16 is swung to its illustrated opened position to dump the wheat which it caught into hopper 18 and to allow the wheat from feeder 12 to enter the hopper. Flow of wheat between feeder 12 and gate 16 is therefore continuous. This clean wheat feed rate is the feed rate W which is used in the previously mentioned expressions for determining the yield and patent extraction.

As shown in FIG. 1, the material dumped from scale 14 is delivered to grinders 26 and then to sifters 28 in the mill. The patent flour, first clear flour, and second clear flour are separated from each other and other by-products by the sifters and are continuously fed to constant dump type scales 30, 31, and 32 respectively.

Scales 30, 31, and 32 are preferably of the same construction, although not necessarily of the same size or capacity, as scale 14. Like reference numerals suffixed by the letter $a$ have therefore been applied to designate the parts of scale 30, whereas like reference numerals suffixed by the letter $b$ have been used to designate the parts of scale 31. Like reference numerals suffixed by the letter $c$ have been applied to designate the parts of scale 32.

The patent flour feed rate between sifters 28 and catch gate 16$a$ is continuous and is the feed rate P used in the previously mentioned equations for determining patent yield, patent extraction, and yield. The first and second clear flour feed rates between sifters 28 and catch gates 16$b$ and 16$c$ are also continuous and respectively represent the feed rates $C_1$ and $C_2$ used in determining the patent yield and yield factors.

It will be appreciated that the foregoing description of the flour mill has been simplified as further details are not needed for an understanding of this invention.

Scales 14 and 30–32 are of the automatic type wherein the catch gate and discharge gate are respectively closed and opened in response to the delivery of a predetermined weight of material in the form of a descending stream to the hopper. After a pre-set time delay, which is long enough to allow the pre-weighed load to be dumped from the hopper, the discharge gate and the catch gate are automatically operated to their positions illustrated in FIG. 1. Each of the catch and discharge gates are operated by motors 34 which are ordinarily of the piston type. Any conventional and suitable mechanism may be employed for automatically controlling operation of the catch and discharge gates as schematically indicated at 36 in FIG. 1. Ordinarily scales 14 and 30–32 are of the pre-weighing type which have a fulcrumed, hopper supporting weigh beam which is counterweighted to balance a predetermined amount of material fed to the scale. When a balanced condition is attained, the load is dumped.

Referring now to FIG. 2, circuit 10 comprises four networks 40, 43, 41 and 42 which are respectively associated with scales 14, 30, 31 and 32. Each of the networks 40–43 functions to develop and memorize a voltage signal which is representative of feed rate as will now be described.

Network 40 comprises a modularized, analogue integrator circuit 46, a multiplier-divider circuit 47, and a modularized sample and hold circuit 48. Circuit 46 provides a linear ramp voltage signal $E_1$ which is substantially proportional to the time for each weighing cycle from dump to dump. Circuit 47, which is connected between circuits 46 and 48, utilizes signal $E_1$ to provide a voltage signal $E_2$. As will be explained in detail later on, signal $E_2$ will substantially be proportional to the average feed rate of clean wheat dispensed by feeder 12 when the ramp signal $E_1$ approaches or reaches its peak value. Circuit 48 samples and memorizes signal $E_2$ at a time when signal $E_2$ is substantially proportional to feed rate. The memorized signal is applied as voltage signal $E_3$ to a further multiplier-divider circuit 50 which will be described in detail later on.

Integrator circuit 46 has an input terminal 52 to which a fixed set point voltage signal is applied by any suitable means such as a potentiometer 54 which is connected across a source of voltage 56.

The voltage signal impressed on terminal 52 is fed through a summing resistor 58 to a summing junction 60 which is connected to the inverting input terminal of an operational amplifier 62 in circuit 46. The non-inverting input terminal of amplifier 62 is clamped to ground. A feedback loop containing a capacitor 64 is connected between junction 60 and a junction 66 at the output of amplifier 62. Capacitor 64 controls the feedback for amplifier 62 in a well-known manner to perform an integrating transfer function for converting the fixed reference signal at terminal 52 into a linear ramp voltage ($E_1$) having a slope which is proportional to the reference signal. Voltage signal $E_1$ is thus equal to $E_i t/RC$ where $E_i$ is the input reference voltage at terminal 52, RC is the time constant for resistor 58 and capacitor 64, and $t$ is time.

A second feedback loop containing a set of contact R2–1 of a reed type integrator reset relay R2 is shunted around capacitor 64 and is connected between junctions 60 and 66 as shown. Owing to the inherent high gain and impedance characteristics of operational type amplifiers, the voltage at junction 60 will deviate from zero volts or ground only by small and negligible amount. When contacts R2–1 are closed, therefore, the voltage ($E_1$) at junction 66 will be clamped substantially at zero volts. Closing of contacts R2–1 thus resets the integrator. As will be described in detail shortly, a control circuit 70 (FIG. 1) responding to the movement of discharge gate 22 momentarily energizes relay R2 to momentarily close contacts R2–1 at the beginning of each cycle for weighing out and dumping the pre-determined weight of clean wheat. Except for a negligible reset time, contacts R2–1 will therefore be opened to allow the ramp voltage ($E_1$) to build up.

From the foregoing, it is clear that the magnitude of signal $E_1$ just before circuit 46 is reset is substantially proportional to the time between successive dumps from scale 14. It is also evident that integrator circuit 46 may be reset to have the ramp commence at any relatively fixed point in the weighing and dumping cycle as long as the time relative to the dumps is constant for all the cycles. The integrator circuit comprising amplifier 62 and capacitor 64 is conventional and preferable is essentially the same as the circuit shown and described on page 15 of the Burr-Brown Research Corp. Handbook (2nd edition) entitled "Handbook of Operational Amplifier Applications" and copyrighted in 1963.

Circuit 47 is also conventional and may be model 19–302 manufactured by CES. This multiplier-divider circuit has three input terminals 72, 73, and 74 and an output terminal 75. The voltage signals applied to terminals 72 and 73 are multiplied together by the multiplier portion of circuit 48, and the product constitutes the numerator in the expression which is set up in the divider portion of the circuit for a division operation. The signal applied to terminal 74 constitutes the denominator in the division operation. The result is obtained at terminal 75. Reference is made to the legend in FIG. 3.

A fixed signal voltage $E_4$ which is developed by suitable means such as potentiometer 78, is impressed on terminal 72. Potentiometer 78 is connected across a suitable voltage source and its wiper, which is connected to terminal 72, is set to a position where the voltage at terminal 72 is proportional to the preselected weight at which scale 14 is set to dump. The actual weight of each dump from scale 14 may vary somewhat from the preselected weight but the error that may result is negligible as long as the accuracy of the scale is held within acceptacle limits. Since each dump has substantially the same weight, signal $E_4$ may be fixed.

A fixed voltage signal $E_5$ is applied to terminal 73 and represents a scaling factor. Its purpose will be explained later on. Signal $E_5$ is developed on the slider of a potentiometer 80 which is connected across a suitable voltage source.

Still referring to FIG. 2, junction 66 is connected to terminal 74 to apply voltage signal $E_1$ thereto. The voltage signal $E_2$ at terminal 75 will therefore equal the product of voltage signals $E_4$ and $E_5$ divided by voltage signal $E_1$. Thus the value of signal $E_2$ is in terms of feed rate (weight per unit time) multiplied by a constant which is determined by the magnitude of signal $E_5$. This rate, as will be explained more fully later on, will be an average feed rate as distinguished from an instantaneous feed rate, for signals $E_4$ and $E_1$ respectively represent the change in weight and the change in time.

Signal $E_2$ is applied to an input terminal 82 of a summing resistor 84 in circuit 48. The other terminal of resistor 84 is connected to a junction 85 which is connected through a set of normally open contacts R3-1 of a relay R3 to a summing junction 86. Junction 86 is connected to the inverting input terminal of an operational amplifier 88. The non-inverting input terminal of amplifier 88 is connected to ground as shown.

A feedback loop containing a storage capacitor 90 is connected between junction 86 and a junction 92 at the output of amplifier 88. A second feedback loop containing a resistor 94 is connected between junctions 85 and 92. This circuitry is conventional as shown on page 99, FIG. 3.75 of the Philbrick Researches Inc. Handbook (2nd edition) entitled "Applications Manual for Computing Amplifiers for Modelling, Measuring, Manipulating and Much Else."

When contacts R3-1 are closed, the feedback loop containing resistor 94 is coupled to the input of amplifier 88. The value of resistor 94 is such that when it is in the active circuit the gain of amplifier 88 will be unity. The voltage applied to junction 92 will therefore be equal in magnitude but opposite in sign to the input voltage, and capacitor 90 will be charged up, thereby "tracking" or sampling and thus memorizing voltage signal $E_2$. Upon opening contacts R3-1, capacitor 90 will provide a voltage ($E_3$) which is equal to that last encountered before the contacts opened. The average clean wheat feed rate thus memorized in the form of signal $E_3$ is impressed upon circuit 50 for determining the patent extraction and yield. Contacts R3-1 are operated to sample signal $E_2$ once for each cycle of the feeeding and dumping operation.

As shown in FIG. 2, networks 41, 42 and 43 are the same as network 40. Like reference characters have therefore been applied to designate like components, with the reference characters in networks 43, 41, and 42 respectively being suffixed by the letters $a$, $b$, and $c$. Networks 41–43 also operate in the same manner as network 40.

As shown in FIG. 2, junctions 92a, 92b, and 92c are respectively connected through summing resistors 98, 99, and 100 to a summing junction 101 in a modularized voltage summing circuit 102. Circuit 102, in addition to including resistors 98–100, comprises an operational summing amplifier 104 having its input terminals respectively connected to junction 101 and to ground. Circuit 102 is of conventional form and produces a voltage signal at the output of amplifier 104 which is proportional to the algebraic summation of the input signals $E_{3a}$, $E_{3b}$, and $E_{3c}$. Since the signs of these signals are alike, they will be added.

Still referring to FIG. 2, circuit 50 is of the same form as circuit 47 and has numerator input terminals 106 and 107, a denominator input terminal 108, and an output terminal 109. The general mathematical expression solved by circuit 50 is shown in FIG. 3.

Junction 92 is connected to terminal 108 to apply signal $E_3$ thereto. The output of amplifier 104 is connected through a switch 112 to terminal 106. The output of amplifier 104 representing the summation of signals $E_{3a}$, $E_{3b}$, and $E_{3c}$ is therefore applied to terminal 106 when switch 112 is closed. A fixed voltage produced by a potentiometer 114 or the like is applied to terminal 107 to place the output voltage of circuit 50 in the range of a standard recorder 116 which is connected to terminal 109.

With the foregoing circuitry, the output voltage at terminal 109 will be proportional to $$\frac{P+C_1+C_2}{W}$$

which is the expression for the yield of the mill. This output voltage is continuously developed and applied to operate recorder 116 when switch 112 is closed.

Scales 14 and 30–32 dump at random time intervals relative to each other, depending only upon the weight of material delivered to each of their hoppers. This, however, does not affect the correctness of the output voltage developed by circuit 50, for any change in the feed rates to any of the scales is quickly reflected by a change in the average feed rate voltages ($E_2$, $E_{2a}$, $E_{2b}$, and $E_{2c}$). These voltages are renewed for each dump from their associated scales so that a change in feed rate from one dump to the next will appear in the output of circuit 50.

With continued reference to FIG. 2, terminal 106 is connected through a further switch 120 directly to junction 92a. Switch 120 is ganged to switch 112 so that when it is opened, switch 112 is closed and when it is closed switch 112 is opened. When switch 120 is closed, therefore, signal $E_{3a}$ is applied to terminal 106 in place of the output signal from amplifier 104. The voltage at terminal 109 will consequently be proportional to $P/W$ and thus to the patent extraction. Recorder 116 is conveniently provided with two indicators, such as pens, to respectively record the patent extraction and yield factors.

As shown in FIG. 2, a further multiplier-divider circuit 122 is provided for determining the patent yield. Circuit 122 is of the same form as circuit 50 and has numerator input terminals 124 and 125, a denominator input terminal 126, and an output terminal 127. The general mathematical expression solved by circuit 122 is shown in FIG. 3. Terminals 124 and 126 are respectively connected to junction 92a and to the output terminal of amplifier 104 to provide for the division of signal $E_{3a}$ by the summation of signals $E_{3a}+E_{3b}+E_{3c}$. The result is therefore equivalent to the patent yield, which as previously mentioned, is equal to $$\frac{P}{P+C_1+C_2}$$

A fixed voltage, which is developed by a potentiometer 128, is applied to terminal 125 to place the output voltage of circuit 122 in the range of a conventional recorder 130 which is connected to terminal 127. Recorder 130 therefore records a value proportional to the patent yield whereas recorder 116 records either the patent extraction or yield factors depending upon the positions of switches 112 and 120. The voltages applied to terminals 107 and 125 are preferably the same so that the scaling factors of the recorded output voltages of circuits 50 and 122 are the same. This permits convenient comparison of the recorded values on recorders 116 and 130.

Feed rate meters 132, 133, 134, and 135 are respectively connected to junctions 92, 92a, 92b, and 92c to provide indications of the average feed rates for the wheat, the patent flour, the first clear flour, and the second clear flour. These meters are of conventional form.

It will be appreciated that the sum of the amounts of patent flour, the two clear flours, and by-products, which are recovered, is approximately equal to the amount of clean wheat fed into the mill. Also, the amount of patent flour recovered will be considerably greater than the amounts of first and second clear flours. From this it is evident that a 300 pound scale having sufficient capacity to weigh out the clean wheat is too large and thus uneconomical for use in weighing the first and second clear flours.

To avoid unwarranted costs for the weighing equipment, scales 14 and 30–32 are therefore of different capacities to closely match the weight of the load to be weighed. Owing to the different scale sizes the cycle time (from delivery to dumping) for scales 14 and 30–32 will not be all alike. To more closely match these different time periods, potentiometers 54, 54a, 54b, and 54c are respectively set, by way of example, for 10 volts, 10 volts, 2 volts, and 1 volt. This is done to utilize the full range of the integrator circuits and to minimize signal deterioration therein. This, however, creates a problem in that the scaling factors of signals $E_1$, $E_{1a}$, $E_{1b}$, and $E_{1c}$ will vary in accordance with the settings of potentiometers 54, 54a, 54b, and 54c. The following table based upon the loads and corresponding scale sizes mentioned above indicates the variation in multiplication or scaling factors for voltage signals $E_1$, $E_{1a}$, $E_{1b}$, and $E_{1c}$ for this embodiment:

| Signal | Designation | Voltage=Time |
| --- | --- | --- |
| $E_1$ | Clean wheat time | 1 volt=0.1 min. |
| $E_{1a}$ | Patent flour time | 1 volt=0.1 min. |
| $E_{1b}$ | First clear flour time | 1 volt=0.5 min. |
| $E_{1c}$ | Second clear flour time | 1 volt=1.0 min. |

It is therefore apparent that the foregoing signals without being scaled to a common rate setting cannot be introduced into the same equation to obtain a meaningful result. The analyzing circuit of this invention, however, is such that it provides a simplified solution to this problem in that scaling or multiplication factors can be introduced at circuits 47, 47a, 47b, and 47c to provide the desired common rating setting. The voltage signals $E_5$, $E_{5a}$, $E_{5b}$, and $E_{5c}$ representing the different scaling factors are applied to terminals 73, 73a, 73b, and 73c for multiplication with the voltage signals $E_4$, $E_{4a}$, $E_{4b}$, and $E_{4c}$ representing the weights of the loads dumped by the scales.

In this embodiment, the scaling factor signals $E_5$, $E_{5a}$, $E_{5b}$, and $E_{5c}$ respectively are, by way of example, 10 volts, 10 volts, 2 volts, and 1 volt. Signals $E_4$, $E_{4a}$, $E_{4b}$, and $E_{4c}$ are provided with a common scaling factor which, by way of example, may be 1 volt=50 pounds for this embodiment. With these values, the feed rate signals $E_2$, $E_{2a}$, $E_{2b}$, and $E_{2c}$ will have a common rate setting of 1 volt=50 pounds per minute. The corresponding voltage signals $E_3$, $E_{3a}$, $E_{3b}$, and $E_{3c}$, may therefore be multiplied, divided and added to obtain the patent yield, patent extraction, and yield factors.

It is to be noted that when the ramp signal $E_1$ is commenced upon resetting integrator circuit 46, signal $E_2$ will have an erroneous value, for the fixed voltage signal $E_4$ will be divided by a signal value that is substantially zero. As a result, signal $E_2$ will be extremely high and will not be representative of the feed rate until signal $E_1$ approaches or reaches the peak of the ramp. In this connection, it is clear that the output of integrator circuit 46 will have a saw-tooth wave configuration, with each ramp representing one cycle being reset at a relatively short fixed time after catch gate 16 is opened to allow delivery of wheat to hopper 18.

The purpose of circuit 48, therefore, is to sample and memorize signal $E_2$ when signal $E_1$ is at or is closely approaching the peak of its ramp. The closer the sample function of circuit 48 is to point where integrator 46 is reset, the more accurate the results. For each cycle, signal $E_2$, of course, will decrease from a high value to a value closely proportional to the average feed rate as signal $E_1$ approaches the peak of its ramp. From this explanation it is clear that signal $E_3$ represents an average feed rate rather than an instantaneous rate.

Circuit 48 enables the application of a fixed voltage source to generate signal $E_4$ in place of more costly load cell or force transducer equipment which would otherwise be needed to determine the feed rate. To obtain a non-erroneous feed rate signal in absence of the novel, cost-reducing combination comprising circuit 48 and a fixed voltage source for developing signal $E_4$, force transducer equipment would be required to generate a signal voltage continuously representing the weight of material delivered to the scale hopper. This force transducer signal, which would vary with the weight of material delivered to the scale hopper, could be differentiated to provide a rate signal (pounds per unit time).

Thus, for applications such as the one described herein, where it is not essential to determine instantaneous feed rates, the present invention provides a simplified analyzing circuit at comparatively low manufacturing costs. It will be appreciated that the voltage signals $E_3$, $E_{3a}$, $E_{3b}$, and $E_{3c}$ represent average rates that the wheat and flours would have if they were continuously flowing from delivery to discharge with respect to each of the scales 14 and 30–32.

It is clear that the foregoing discussion pertaining to network 40 applied equally to networks 41–43, as networks 40–43 are identical.

Another advantage of the novel integrator and sample and hold circuit combination mentioned above is that circuits 46, 46a, 46b, 46c, 48, 48a, 48b, and 48c each may be applied in printed circuit form to printed circuit cards which are adapted to removably be plugged into a motherboard or the like. The purpose of the motherboard is to interconnect the modularized circuits and to provide the necessary connections to the non-modularized portions of the previously described analyzing circuitry. The circuits applied to the printed circuit cards are schematically shown to be contained in the boxes designated by the reference characters 46, 46a, 46b, 46c, 48, 48a, 48b, and 48c. Also, each of the multiplier-divider circuits and the summing circuit comprising amplifier 104 and resistors 98–100 together with their associated, interconnecting conductors may advantageously be applied to a printed circuit card.

Printed circuit cards reduce the amount of hand wiring that is needed to make the circuit. This minimizes errors in wiring the different electrical components together and further reduces costs of labor. In addition, printed circuit cards are readily replaceable simply by unplugging an installed card and plugging another in its place on the motherboard. Repairs or modifications of the circuit are thus made very convenient.

Referring now to FIG. 4, circuit 70 is divided into four identical networks 156, 157, 158, and 159 which are connected through a switch 152 to terminals 153 of a suitable voltage source. Network 156 controls operation of relays R2 and R3, network 157 controls operation of relays R2a and R3a, network 158 controls operation of relays R2b and R3b, and network 159 controls operation of relays R2c and R3c.

Network 156 comprises a pair of conductors 150 and 151 which are connected to the terminals of switch 152. A limit switch 162 has one of its terminals connected to conductor 150 and the other of its terminals connected to a junction 163. Switch 162 is controlled by operation of discharge gate 22 and opens and closes when gate 22 is respectively opened and closed. When 300 pounds of wheat accumulates in hopper 18, gate 22 opens to discharge the load in the hopper. After a sufficient delay to complete the discharge, gate 22 closes to accumulate the next 300 pound load of wheat in hopper 18. Switch 162 is closed by closing gate 22.

A timer T1 and a relay R1 are connected in parallel branches between junction 163 and conductor 151. When switch 162 is closed, two energizing circuits are therefore completed for timer T1 and relay R1 respectively. Timer T1 has a set of normally closed time delay contacts T1–1 and a set of normally open time delay contacts T1–2. Timer T1 is of the slow pull-in type with the result that follwing a pre-set time delay after the timer motor (not shown) is energized, contacts T1–1 open and contacts T1–2 close. These contacts are reset when switch 162 is opened to de-energize timer T1.

Relay R1 has a set of normally open contacts R1–1 which are connected in series with contacts T1–1 and the operating coil of relay R3 between conductors 151 and junction 163. When the energizing circuit for relay R1 is completed by closing switch 162 contacts R1–1 close immediately. At this stage, contacts T1–1 are still closed with the result that relay R3 will be energized.

Energization of relay R3 closes contacts R3–1 to charge capacitor 90 and thereby sample signal $E_2$. When timer T1 times out after a short period, contacts T1-1 open and contacts T1-2 close. By opening contacts T1-1, relay R3 is de-energized to open contacts R3-1 to store the memorized signal $E_2$ and thus apply a voltage at junction 92 which will be equal to that last encountered before the contacts were opened.

Closing of contacts T1-2 completes a circuit for simultaneously energizing a second timer T2 and another control relay R4. This timer and relay energizing circuit passes through switch 162 with the result that when switch 162 opens timer T2 and relay R4 are de-energized. Timer T2 has a set of normally closed contacts T2-1 and is of the slow pull-in type with the result that contacts T2-1 open following a short pre-set time delay after the timer motor (not shown) is energized. Relay R4 has a set of normally open contacts R4-1 which is connected in series with contacts T2-1 and relay R2 between conductor 151 and junction 163.

When relay R4 is energized by the closure of contacts T1-2, contacts R4-1 will close to complete a circuit through contacts T2-1 to energize relay R2. Energization of relay R2 closes contacts R2-1 to reset integrator circuit 46.

Following a short time delay, timer T2 times out to open contacts T2-1, thereby interrupting the energizing circuit for relay R2. As a result, contacts R2-1 open to start generation of the ramp signal $E_1$. At this stage, switch 162 is closed and clean wheat is entering and accumulating in hopper 18.

When the pre-set weight of clean wheat has been delivered to hopper 18, mechanism 36 is operated by the balanced scale condition to close catch gate 16 and to open discharge gate 22.

By opening discharge gate 22, switch 162 is opened to interrupt the energizing circuits for timers T1 and T2 and relay R1. The contacts of timers T1 and T2 will thereby be reset. Relay R3 remains de-energized to prevent circuit 48 from sampling signal $E_2$.

From the foregoing it is clear that when discharge gate 22 is opened to open switch 162, relay R2 remains de-energized, thus allowing the ramp signal $E_1$ to continue to build up.

After a sufficient delay to allow the load in hopper 18 to be dumped, gate 22 is closed again to thus close switch 162. Relay R1 is thereby re-energized to again energize relay R3. Contacts R3-1 close to thus start the sampling period which is determined by the time setting of timer T1.

When timer T1 times out, relay R3 is de-energized, as previously described, to terminate the sampling period and to re-energize timer T2 and relay R4. At this moment, therefore, relay R2 is energized to reset integrator circuit 46.

From the foregoing it will be appreciated that circuit 48 samples and memorizes signal $E_2$ at a time at which the ramp signal $E_1$ is at least closely approaching or substantially at its peak value just before being reset by energization of relay R2. Therefore, the time measured in terms of voltage on the ramp is closely equivalent to the time in which the constant weight (300 pounds) of clean wheat will be delivered by feeder 12.

As shown in FIG. 4, networks 157, 158, and 159 are the same as network 156. Accordingly like reference characters have been applied to designate the components of networks 157-159, with the suffix a being applied to the reference characters for network 157, the suffix b being applied to the reference characters for network 158, and the suffix c being applied to the reference characters for network 159. Since the networks 157-159 operate in exactly the same manner as network 156, it is clear that no further description regarding the operation of networks 157-159 is required.

It is also apparent that limit switches 162, 162a, 162b, and 162c could be operated by means other than the discharge gates of scales 14 and 30-32 respectively. For example, these limit switches may be operated by the catch gates of scales 14 and 30-32.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination with a weighing apparatus for cyclically weighing out and discharging successive, discrete measured loads of material of pre-selected weight and means for delivering the material to said apparatus, flow rate-determining means including an electrical circuit under the control of said apparatus for producing an electrical signal that provides a determination of the rate at which material in said loads is moving as it if were flowing continuously through said apparatus.

2. In combination with a weighing apparatus for cyclically weighing out and discharging successive, discrete measured loads of material of predetermined weight and means for delivering the material to said apparatus, a flow rate-determining means comprising means for producing a first electrical signal having a value corresponding to the time required for each of said loads of material to pass through said weighing apparatus, and means responsive to said first signal for producing a second signal that provides a determination of the flow rate that the material would have if it were flowing continuously through said weighing apparatus.

3. A rate determining device for a flowing material comprising means for producing a first signal which varies in accordance with the time required for a predetermined weight of said material to move past a given point, means for producing a selectively preset signal representative of said predetermined weight, and means responsive to said first and second signals for providing a determination of the flow rate of said material, said first signal producing means comprising an electrical integrator circuit responding to a fixed reference voltage to provide said first signal in the form of a ramp output voltage, the maximum value of said ramp voltage being substantially representative of the total time elapsed during the movement of said predetermined weight past said point.

4. The rate determining device defined in claim 3 wherein said means responsive to said first and second signals comprises circuit means for producing a rate signal representative of the quotient of said second signal divided by said first signal and means for sampling said rate signal at a time when said ramp voltage is at least approaching its maximum value.

5. The rate determining device defined in claim 4 wherein said sampling means comprises an electrical network for memorizing the sampled signal.

6. A rate determining device for a flowing material comprising means for producing two separate preset signal voltages of predetermined magnitudes, and means operatively connected to said signal voltage producing means and being responsive to said signal voltages for producing a signal representative of the rate at which said material is flowing, said means for producing said signal representing the material flow rate comprising printed circuit means operative to convert a predetermined one of said preset signals into a further signal representative of the time in which a predetermined weight of said material passes a given point and further circuit means operative to divide said further signal into the other of said preset signals, said other of said preset signals being representative of said predetermined weight.

7. A rate determining device for a flowing material comprising means for producing two separate, fixed, pre-set electrical signals of predetermined magnitudes, and means operatively connected to said pre-set signal producing means and being responsive to said pre-set signals for producing a third signal that provides a determination at which said material is flowing, said third signal-producing means comprising (a) first circuit means operative to convert a predetermined one of said pre-set signals into a further signal that represents the time in which a predetermined weight of said material passes a given point and (b) second circuit means operative to divide said further signal into the other of said pre-set signals, with said other of said pre-set signals being representative of said predetermined weight.

8. A rate-determining device for determining the flow rate of at least one material wherein the material, whose flow rate is to be determined, is cyclically weighed out and discharged in successive discrete drafts of predetermined weight by a weighing apparatus, said rate-determining device comprising a first electrical network for producing a first electrical signal having a value corresponding to the time required for each draft of predetermined weight to pass through the weighing apparatus, a second electrical network for producing a second electrical signal corresponding to said predetermined weight, and a third electrical network responsive to said first and second signals for producing a third electrical signal that is proportional to said second signal divided by said first signal and thereby provides a determination of the rate at which material in each draft is moving as if it were flowing continuously through said apparatus.

9. A rate determining device for a flowing material comprising means including an electrical integrator circuit for producing a linear ramp voltage signal which as a measure of the time in which a predetermined weight of said material moves past a given point, means for producing a further voltage signal representative of said predetermined weight, first circuit means operatively connected to said integrator circuit and to said further signal producing means and being responsive to said ramp signal and said further signal to produce a rate signal representative of the quotient of said further signal divided by said ramp signal, and second circuit means operatively connected to said first circuit means for sampling said rate signal at a time when said ramp signal is at least approaching its maximum value.

10. The rate determining apparatus defined in claim 9 wherein said further signal has a fixed, pre-set value.

11. The rate determining apparatus defined in claim 10 wherein said sampling circuit means comprises means for memorizing said sampled rate signal.

12. In an analyzing device for solving at least one mathematical expression containing a plurality of material flow rates, a plurality of electrical networks and signal responsive circuit means operatively connected to said networks for solving said mathematical expression, each of said networks comprising an integrator circuit for producing a linear ramp voltage signal which is a measure of the time in which a predetermined weight of a material whose flow rate is to be determined moves past a given point, means for producing a pre-set voltage signal representative of said predetermined weight, a first circuit operatively connected to said pre-set signal producing means and said integrator circuit for producing a rate signal representative of the quotient of said pre-set signal divided by said lamp signal, and a second circuit for sampling and memorizing said rate signal at a time when said ramp signal is at least approaching its maximum value, the ramp signals of said plurality of networks having different scaling factors, and means in each network for producing a scaling factor signal, said first circuit of each network being operatively connected to said scaling factor producing signal means for multiplying said scaling factor signal and said pre-set signal, the scaling factor signals of said networks being pre-set to provide the rate signals with a common scaling factor, the sampled and memorized signals being supplied to said circuit means for solving said mathematical expression.

13. In combination with a weighing apparatus having a hopper for receiving material flowing in a process, a catch gate for interrupting delivery of material to said hopper, a discharge gate for discharging material from said hopper, and means responsive to the weight of material delivered to said hopper for controlling the operation of said catch and discharge gates for cyclically delivering and discharging successive discrete constant weights of said material, an integrator circuit responsive to a fixed reference signal for producing a linear ramp voltage signal, means responsive to the operation of at least one of said gates to re-set said ramp signal at a common point of time in each cycle of delivery and discharge of said weight of the material whereby the maximum voltage of the ramp signal represents the time of each cycle, and means operatively connected to said integrator circuit and being responsive to said ramp signal for producing a signal representative of the flow rate that the material would have if it were flowing continuously.

References Cited

UNITED STATES PATENTS

| 3,139,217 | 6/1964 | Mell | 235—151.33 XR |
| 3,162,325 | 12/1964 | Hall et al. | 235—151.1 XR |
| 3,203,591 | 8/1965 | Daulton et al. | 235—151.33 XR |
| 3,260,320 | 7/1966 | Clamp | 235—151.33 XR |
| 3,433,935 | 3/1969 | Sherman | 235—151.34 XR |

EUGENE G. BOTZ, Primary Examiner

E. J. WISE, Assistant Examiner

U.S. Cl. X.R.

177—16, 17; 235—151.33, 151.34